3,037,835
PROCESSES FOR IMPROVING THE DYEABILITY OF TEXTILE FIBERS, FILMS, AND MOULDED ARTICLES
Alberto Bonvicini, Milan, and Cornelio Caldo, Terni, Italy, assignors to Montecatini Società Generale per l'Industria Mineraria e Chimica, Milan, Italy
No Drawing. Filed June 30, 1959, Ser. No. 823,841
Claims priority, application Italy July 2, 1958
12 Claims. (Cl. 8—55)

This invention relates primarily to a method of improving the receptivity of synthetic resins and polymers to dyes of various types.

It is known that fibers, tapes, films and similar materials consisting of synthetic polymers have limited receptivity towards various classes of dyes, which when applied by ordinary methods give unsatisfactory results.

The problem of dyeing articles made of synthetic resins such as polyacrylonitrile, polyvinyl chloride, polymethacrylate, poly-methyl methacrylate and cellulose acetate, is of great practical importance.

An object of the present invention is to provide a process by which fibers are obtained which are easily dyeable by the various classes of dyes. This is accomplished by incorporating ethylenimine polymers into the polymers previously mentioned.

The preferred processes comprise adding the polyimine to the polymer in predetermined proportions, the polymer being the one of which the article to be dyed is formed, or the polyimine can be added to the monomer from which the said polymer is obtained.

In some cases it is necessary or advantageous to subject the polyimine to a pre-treatment, which generally consists in making the polyimine partially insoluble by means of an oxidizing agent and by salifying it with acetic or hydrochloric acid.

Modified or unchanged polyimines are usually employed of the type

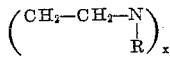

in which R can be hydrogen, alkyl or aryl. These polyimines are mixed with the polymer, or the monomer from which the polymer is obtained, in varying quantities but within certain limits and, to be more precise, preferably such that the ratio of polyimine to polymer is between a minimum value of 1:99 and a maximum value of 20:80.

The modification of the resin can be carried out by incorporating into it exclusively the polyimines described above. In another embodiment, it is possible to achieve good dyeability by using special kinds of polyimines as modifying agents, namely such as are obtained from reactions between polyimines and various other substances.

It is essential, however, that such modified polyimine be soluble in the spinning solvent, or that it should at least be incorporatable into the polymer mass. In particular, during the preparation of fibers from polyacrylonitrile, or acrylonitrile copolymers, the products of cyanoethylation of polyimine, obtained through ethylenimine polymerization, have been found suitable.

In some cases it will be necessary to precede the dyeing of the moulded or spun article with the treatment by appropriate substances, for instance, hexa-methylene-isocyanate, by which treatment the previously added polyimine is made insoluble.

As explained above, the method is suitable for the preparation of fibers, films, tapes and similar materials formed from poly-acrylonitrile, polyvinyl chloride, polymethylmethacrylate or cellulose acetate modified as described, to make them easily dyeable with various types of dye. Such articles, when made of the same resins which have not been treated with polyimine or modified polyimine, generally have slight or no receptivity towards such dyes.

The following examples illustrate preferred embodiments of the invention, without limiting its scope.

*Example 1*

A polyimine, namely the polymerized ethylene imine described below, having a coefficient of viscosity $[\eta]=0.16$ at 25° C. in water, containing 50% water and 29.6% nitrogen, is heated with 10% of 120 volumes of hydrogen peroxide for an hour at 120° C. and is strongly agitated and then salified with $CH_3COOH$. 50 grams of the polyimine thus modified are dissolved in 3000 g. dimethylformamide. To the solution 950 grams of polyacrylonitrile of M.W. 70,000 are added.

The collodion formed is dispersed in the cold and agitated for 1½ hours. The cold dispersion is successively heated for 15 minutes at 120° C. so that a homogeneous liquid solution is obtained ready to be used in the following spinning operation, which is carried out by means of a 100 hole spinnerette (0.2 mm. per hole).

The yarn thus obtained, and stretched at a ratio of 1:4, has considerable affinity for wool acid dyes.

Its serimetric features are:

Resistance _____ 2.2 g./denier.
Elongation _____ 12.4%.

The yarn when dyed with acid dyes exhibits good fastness to light and rubbing.

*Example 2*

Into a 35-liter reactor there are introduced, successively, 970 grams of acrylonitrile, 9000 g. distilled water, 30 g. polyimine, 100 g. $K_2S_2O_8$, that is, potassium peroxy disulfate, and 5 g. $NaHSO_3$. The latter two ingredients render the polyimine less soluble in water.

Polymerization is carried out under agitation for one hour at 55° C. The polymer that forms is filtered under suction, abundantly washed with water and dried in an oven at a temperature not exceeding 70° C. Afterwards a mixture is prepared consisting of 600 g. of the polymer obtained according to the foregoing example, 200 g. pure poly-acrylonitrile and 3.3 g. $TiO_2$. To this mixture are added in the cold under agitation 3200 g. dimethylformamide. The dispersion obtained is transformed into a solution and is then spun in the manner described in the preceding example. The yarn thus obtained, and stretched at a ratio of 1:4.5, exhibits the following serimetric properties:

Resistance _____ 1.74 g./denier.
Elongation _____ 14.6%.

The results of measurements of moisture conditioning of said yarn are listed in the following table.

| Relative room moisture, percent | Moisture recovery, percent |
|---|---|
| 50 | 0 |
| 80 | 0.15 |
| 100 | 9.5 |

The yarns thus obtained are satisfactorily receptive towards basic dyes and dispersed acetate dyes.

*Example 3*

Into a 35-liter reactor there are introduced, successively 736 grams of acrylonitrile, 40 g. methyl methacrylate, 9000 g. distilled water, 50 g. polyimine salified with hydrochloric acid, 80 g. potassium persulphate and 4 g. sodium bisulphite.

Polymerization is carried out by stirring the mixture for 90 minutes at 55° C. The resulting polymer is then washed and dried. Its molecular weight is about 79,000. Said yarn is spun as usual, and the fibers obtained are well dyeable with basic dyes and dispersed acetate dyes.

Example 4

50 grams of anhydrous polyimine which have been oxidized with hydrogen peroxide, or any other oxidizing agent, are dissolved hot in 1012 g. nitromethane. After the solution has been cooled, 4048 g. trichloroethylene are added and to this new solution 950 g. of a polyvinyl chloride suspension (K by Fikentscher=65) are added.

After the mixture has been agitated in the cold for 30 minutes, it is heated at 70–75° C. for 3½ hours. The resulting collodion, which is homogeneous and transparent, is then dissolved and spun. The yarn stretched at a ratio of 1:4 has the following serimetric characteristics:

Resistance _____ 1.58 g./denier.
Elongation _____ 12%.

The polyimine is made insoluble by treating it with hexamethylenisocyanate in benzenic solution and the dyeing is then proceeded with. The yarns thus treated will easily be dyeable with acid dyes.

Example 5

Into a suitable autoclave are introduced 80 grams methylmethacrylate, 800 g. distilled water, 5 g. polyimine salified with hydrochloric acid, 8 g. potassium persulphate, and 0.4 g. NaHSO₃. The latter two ingredients make the polyimine less soluble in water.

Polymerization is carried out for 90 minutes at 55° C. From the resulting polymer one obtains films which have excellent dyeability properties with respect to acid dyes.

Example 6

90 parts by weight of poly-acrylonitrile (molecular weight 75,000) are heated with 10 parts by weight of poly-ethylene-iminecyanoethylate. The latter is obtained by adding acrylonitrile to a concentrated aqueous polyimine solution in the absence of a catalyst and is then precipitated with alcohol after neutralization with hydrochloric acid. Said heating is carried out between 40 and 50° C.

The polyacrylonitrile - polyethylenimine cyanoethylate mixture is dissolved in dimethylformamide so as to give a 12% solution. From this solution one prepares films which, after the solvent has been evaporated, exhibit good dyeability with respect to acid dyes and dispersed acetate dyes.

Example 7

0.3 g. polyethylenimine are dispersed in about 100 cc. (80 g.) acetone to which 10 g. of cellulose diacetate are then added, while strongly agitating for 2 hours. The collodion-like liquid obtained is spread on a smooth surface by means of an appropriate film-stretching device and heated in an oven at 70° C. so that a film of 0.1 mm. thickness is obtained.

This film shows good dyeability properties with respect to the following acid wool dyes:

Solid light yellow
Empire Blue 6B
Solid Red A
Alizarine Violet 3B

In Example 1 a polyethylenimine is employed having a specific viscosity of 0.16 at 25° C., measured by a 0.1% water solution (or a specific viscosity of 1.44 at 25° C., measured by a 5% water solution). This is a higher polyimine, having a sequence of (—CH₂CH₂NH—) units varying between about 25 and about 100.

In all the seven examples the same polyimine is employed, as such, or after the modifications described therein.

In respect to the number of monomer units in the polyimines, we prefer those of the following general formula:

$$F(-CH_2CH_2NH-)_nF'$$

in which F and F' are the end groups, one of which may be an —NH₂ group and the other a hydrogen atom, $n$ being an integer in the range 2 to 500.

The oxidation is intended to make the polyimine insoluble in water. The subsequent salification does not make the polymer more soluble in water, because not the polyimine but a reticulation product thereof is salified. That is, the oxidation treatment renders the polyethylenimine insoluble or scarcely soluble in water. The subsequent salification makes the oxidized product more easily soluble in dimethylformamide.

The copolymers of the monomers acrylonitrile, vinyl chloride, methyl acrylate, methyl methacrylate, preferably are prepared with a major amount by weight of said monomer, namely at least about 85 percent thereof.

The following are examples of copolymers which can be employed according to this invention:

—Acrylonitrile copolymers: copolymer of acrylonitrile and methyl methacrylate (96–4%); copolymer of acrylonitrile and methyl acrylate (97–3%).
—Vinyl chloride copolymers: vinylchloride with vinyl acetate (99–1%).

The specific dyes which are used in examples are the following.

Example 1

Wood acid dyes:
    Fast Red A
    Empire Blue 6B
    Alizarine Violet 3B
    Wool Red B

Example 2

(a) Basic dyes:
    Astrazon Red 6B
    Astrazon Blue G
    Malachite Green XX
(b) Acetate dyes:
    Violet Cibacet DR
    Yellow Setacyl 3G
    Red Cibacet B
    Scarlet Cibacet G

Example 3

As in Example 2.

Example 4

As in Example 1, replacing Alizarin Violet 3B with Light Fast Yellow; moreover;

Acid dyes:
    Red Novamin B
    Fast Yellow 2G
    Alizarine Blue SE

Example 5

As in Example 1 or 4.

Example 6

As in Example 2 or 4 (acetate or acid dyes).

We claim:

1. A process for improving the dyeability of moulded articles, fibers, films, ropes, and tapes comprised of at least one resin taken from the group consisting of cellulose acetate, homopolymers and copolymers of acrylonitrile, vinyl chloride, methyl acrylate, and methyl methacrylate, comprising intimately incorporating therewith, at a stage prior to forming said article, polymerized ethylene imine, said forming being a dry forming from solution in an organic solvent.

2. The process of claim 1, the polymerized ethylene imine having a viscosity of 0.16 at 25° C. measured by a 0.1% water solution thereof.

3. The process of claim 1, the solvent being dimethylformamide.

4. A process comprising improving the dyeability of spun fibers formed of at least one resin taken from the group consisting of cellulose acetate and homopolymers and copolymers of acrylonitrile, vinyl chloride, methyl acrylate, and methyl methacrylate, by intimately incorporating therewith, at a stage prior to spinning and dyeing, a modified polyimine, spinning the resin in suspension in dimethyl formamide into a fiber, and dyeing the fiber, said modified polyimine being cyano-ethylated polymerized ethylene imine prepared by reacting acrylonitrile and polymerized ethylene imine.

5. A process comprising forming a suspension in dimethylformamide, of poly-acrylonitrile and a modified polyethylene imine, the latter being prepared by treating polymerized ethylene imine with hydrogen peroxide and acetic acid, spinning said solution into a filament, and dyeing the filament with an acid wool dye.

6. A process comprising subjecting to polymerization an aqueous mixture of acrylonitrile, polymerized ethylene imine, potassium peroxydisulfate, and sodium bisulfite, thereafter adding poly-acrylonitrile and titanium dioxide and forming a dispersion in dimethylformamide, spinning said dispersion into a filament, and dyeing the filament.

7. A process comprising heating poly-acrylonitrile with a minor amount by weight of poly-ethylene-imine-cyanoethylate, dissolving in dimethylformamide, forming the product into a shaped article, with evaporation of the dimethylformamide, and thereafter dyeing the article, the poly-ethylene-imine-cyanoethylate being the reaction product of acrylonitrile and polymerized ethylene imine.

8. A process comprising subjecting to polymerization an aqueous mixture of acrylonitrile, methyl methacrylate, potassium persulfate, sodium bisulfite, and polymerized ethylene imine salified with hydrochloric acid, dry spinning said polymer, suspended in dimethylformamide, into a fiber by passing the suspension through a spinnerette and evaporating the dimethylformamide, and thereafter dyeing the fiber.

9. A process comprising subjecting to polymerization an aqueous mixture of methyl methacrylate, potassium persulfate, sodium bisulfite, and polymerized ethylene imine salified with hydrochloric acid, dry spinning said polymer, suspended in dimethylformamide, into a fiber by passing the suspension through a spinnerette and evaporating the dimethylformamide, and thereafter dyeing the fiber.

10. A process comprising dispersing, in acetone, cellulose diacetate and a minor amount by weight, with respect to the diacetate, of polymerized ethylene imine, forming a film from the resulting suspension, with removal of acetone, and dyeing the film with an acid wool dye.

11. A process for improving the dyeability of articles including moulded articles, fibers, films, ropes, and tapes, comprised of at least one resin taken from the group consisting of cellulose acetate and homopolymers and copolymers of acrylonitrile, vinyl chloride, methyl acrylate, and methyl methacrylate, comprising intimately incorporating polymerized ethylene imine therewith, at a stage prior to forming the article, said polymerized ethylene imine being made insoluble by treatment with hexamethylenisocyanate after the polymerized ethylene imine is incorporated but prior to dyeing, the forming being a dry forming from an organic solvent.

12. The process of claim 11, the solvent being dimethylformamide.

References Cited in the file of this patent

UNITED STATES PATENTS

| 2,899,262 | Stanton | Aug. 11, 1959 |
| 2,917,474 | Fisher | Dec. 15, 1959 |

FOREIGN PATENTS

| 536,686 | Great Britain | May 23, 1941 |
| 613,817 | Great Britain | Dec. 3, 1948 |
| 904,348 | Germany | Feb. 18, 1954 |